US012197562B2

(12) United States Patent
Razi et al.

(10) Patent No.: US 12,197,562 B2
(45) Date of Patent: Jan. 14, 2025

(54) CUSTOMIZED ANOMALY DETECTION IN SANDBOX SOFTWARE SECURITY SYSTEMS USING GRAPH CONVOLUTIONAL NETWORKS

(71) Applicant: Fortinet, Inc., Sunnyvale, CA (US)

(72) Inventors: Kamran Razi, West Vancouver (CA); Jun Cai, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 112 days.

(21) Appl. No.: 17/566,806

(22) Filed: Dec. 31, 2021

(65) Prior Publication Data

US 2023/0222208 A1  Jul. 13, 2023

(51) Int. Cl.
*G06F 21/53* (2013.01)
*G06F 21/56* (2013.01)
*G06N 3/08* (2023.01)

(52) U.S. Cl.
CPC ............ *G06F 21/53* (2013.01); *G06F 21/565* (2013.01); *G06N 3/08* (2013.01); *G06F 2221/033* (2013.01)

(58) Field of Classification Search
CPC .. G06F 21/53; G06F 21/565; G06F 2221/033; G06F 21/56; G06N 3/08
See application file for complete search history.

(56) References Cited

U.S. PATENT DOCUMENTS

| 2018/0025157 A1* | 1/2018 | Titonis | H04W 12/128 726/22 |
| 2020/0118028 A1* | 4/2020 | Harris | G06N 3/08 |
| 2021/0092140 A1* | 3/2021 | Kazerounian | H04L 63/1425 |
| 2022/0171936 A1* | 6/2022 | Wang | G06F 40/289 |
| 2023/0088676 A1* | 3/2023 | She | G06N 3/088 706/25 |

OTHER PUBLICATIONS

Seth et al., How does Backward Propagation Work in Neural Networks? https://www.analyticsvidhya.com/blog/2021/06/how-does-backward-propagation-work-in-neural-networks/ Jun. 8, 2021 (Year: 2021).*
Brownlee et al. Loss and Loss Functions for Training Deep Learning Neural Networks,https://machinelearningmastery.com/loss-and-loss-functions-for-training-deep-learning-neural-networks/, Oct. 23, 2019 (Year: 2019).*

* cited by examiner

*Primary Examiner* — Robert B Leung
*Assistant Examiner* — Howard H. Louie
(74) *Attorney, Agent, or Firm* — Law Office of Dorian Cartwright; Dorian Cartwright (57) ABSTRACT

An ML (machine learning) training logs are parsed for generating a set of heterogenous graphs having embedded nodes connected with edges determined with link prediction and denoting a hierarchical relationship between nodes. Each graph represents benign behavior from executing one of the files of a training database in the sandbox, wherein the nodes are embedded in the graph using GCN (graph convolution network) to calculate a real-valued vector with fixed dimension. A runtime module to receive an untagged file in real-time for analysis from a network component, and generates a graph of runtime behavior from sandbox of the suspicious file for comparison against the training graphs.

12 Claims, 6 Drawing Sheets

| Network Traffic | (protocol:https, destination_port: 80, method: GET, ... ) |
| --- | --- |
| Dropped XLS | (type: XLS, size: 58490) |
| Office Static Analysis | (number of macros: 1, size of text 516) |
| File operation MDF | (filepath: %TEMP%, file extension: EXE, ...) |
| PE Static Analysis | (size: 25845, type: DLL, entropy: 5.6, no_imported_functions: 25, ...) |

CUSTOMIZED ANOMALY DETECTION IN SANDBOX SOFTWARE SECURITY SYSTEMS USING GRAPH CONVOLUTIONAL NETWORKS

FIELD OF THE INVENTION

The invention relates generally to computer networking, and more specifically, to identify suspicious behavior of files in a sandbox using graph networks.

BACKGROUND

Sandboxing refers to a family of techniques that provide a safe and monitored environment to observe runtime behavior of software samples. The result of sandboxing software can be multiple different behaviors including network traffic, file operations, system API calls, and the like. These behaviors are logged for subsequent analysis.

Tagging potential malicious and suspicious behaviors is typically done by cybersecurity experts and are stored as security rules. These hand-crafted rules are scanned against new behavior logs resulting from execution of unknown samples in a sandbox device. Maintenance of this rule-based system is frequently done to ensure detection effectiveness is constantly achieved. A rule may cause a false detection where an observed behavior is benign. A more complex case is where multiple rules cause a false detection. In this case, it is preferred to adjust one of them that will cause less detection loss.

In addition to the false positive issue mentioned above, it is desired to have a detection system that tag borderline suspicious behaviors. This is the case where the observed behavior does not cause a harm to the host system, but it does not belong to the class of typical behaviors seen in an organization endpoint or in a network traffic.

Therefore, what is needed is a robust technique for identifying suspicious behavior of files in a sandbox using graph networks.

SUMMARY

These shortcomings are addressed by the present disclosure of methods, computer program products, and systems for identify suspicious behavior of files in a sandbox using graph networks.

In one embodiment, an ML (machine learning) training logs are parsed for generating a set of heterogenous graphs having embedded nodes connected with edges determined with link prediction and denoting a hierarchical relationship between nodes. Each graph represents benign behavior from executing one of the files of a training database in the sandbox, wherein the nodes are embedded in the graph using GCN (graph convolution network) to calculate a real-valued vector with fixed dimension. The parameters of GCN to calculate node embeddings are derived during the ML training phase. Training target of GCN is based on setting scores of existing links high and setting scores of non-existing links low. The score is simply set to inner product of two real-valued embeddings vectors of corresponding nodes.

In another embodiment, a runtime module to receive an untagged file in real-time for analysis from a network component, and to generate a graph of runtime behavior from sandbox of the suspicious file. Sandbox behavior of an untagged file is parsed and the GCN, obtained in the previous training phase, is used to calculate node embeddings. Based on embeddings, the existing links are scored. If a score is below a predetermined threshold then behavior is suspicious and if above the predetermined threshold then behavior is benign. A security action can be taken against suspicious files.

In still another embodiment, customizable detection addresses needs of different organizations by running ML training on logs from a private network.

Advantageously, computer hardware and computer network performance are improved with enhanced malware security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for identifying suspicious behavior of files in a sandbox using graph networks.

One of ordinary skill in the art will recognize many additional variations made possible by the succinct description of techniques below.

I. Systems for Identifying Suspicious Behavior in a Sandbox (FIGS. 1-2)

Figure 1:
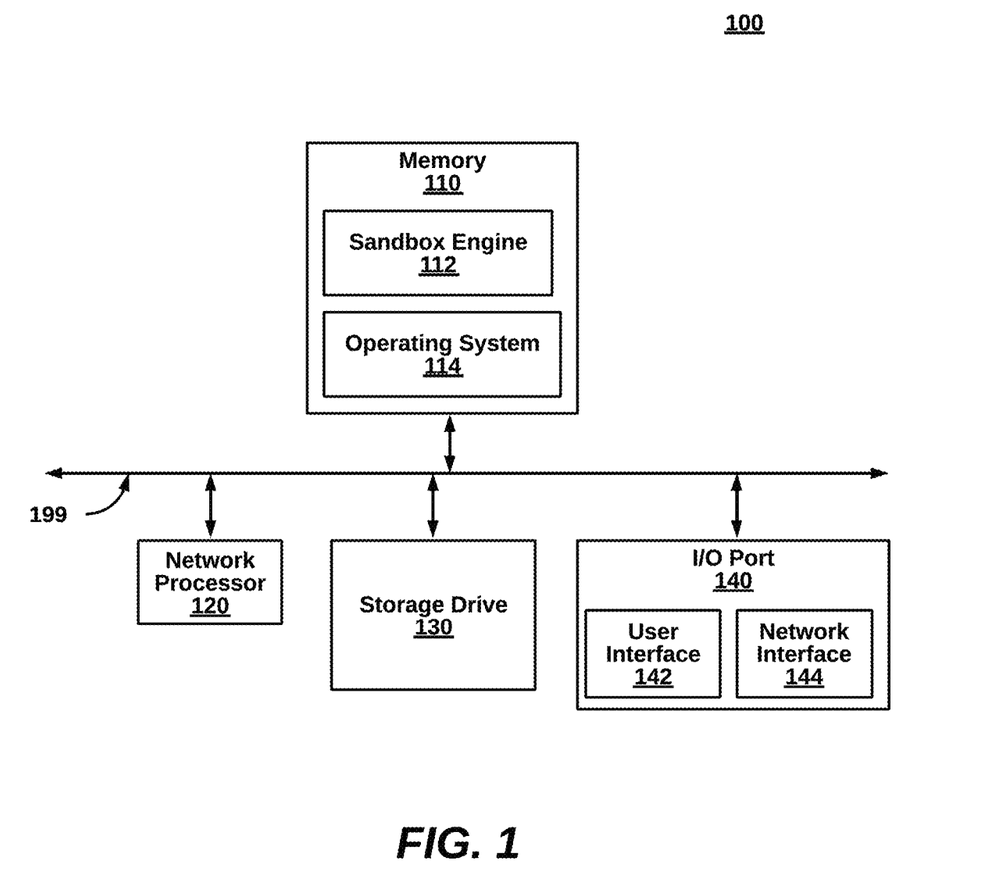
FIG. 1 is a high-level block diagram illustrating a computing device identify suspicious behavior of files in a sandbox using graph networks, according to an embodiment.
Figure 2:
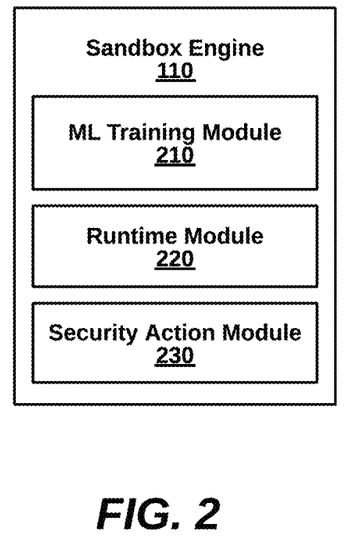
FIG. 2 is a more detailed block diagram illustrating of a sandbox module of the system of FIG. 1, according to an embodiment.

FIG. 1 is a FIG. 1 is a high-level illustration of a sandbox device 100 for identifying suspicious behavior of files in a sandbox using graph networks, according to an embodiment. The sandbox device 100, of the present embodiment, includes a memory 110, a network processor 120, a storage drive 130, and an I/O port 140. In other embodiments, the sandbox device 100 is implemented within another network device, such as a firewall or gateway. Many other configurations are possible, for example, with additional network components such routers, switches, repeaters, firewalls, and the like. Also, there can be many more or fewer clients in FIG. 1.

The sandbox device 100 can be coupled in communication over the data communication network. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

Figure 3:
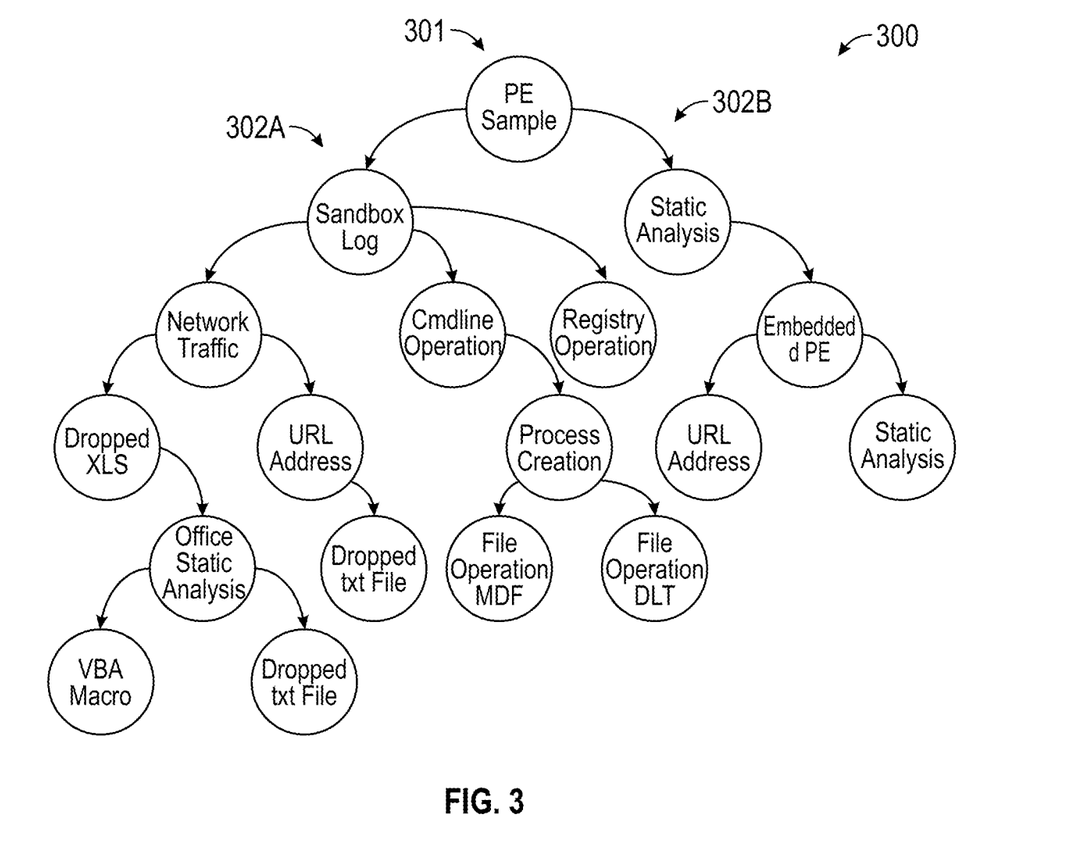
FIG. 3 is an example of a behavior log, according to some embodiments.
Figure 5:
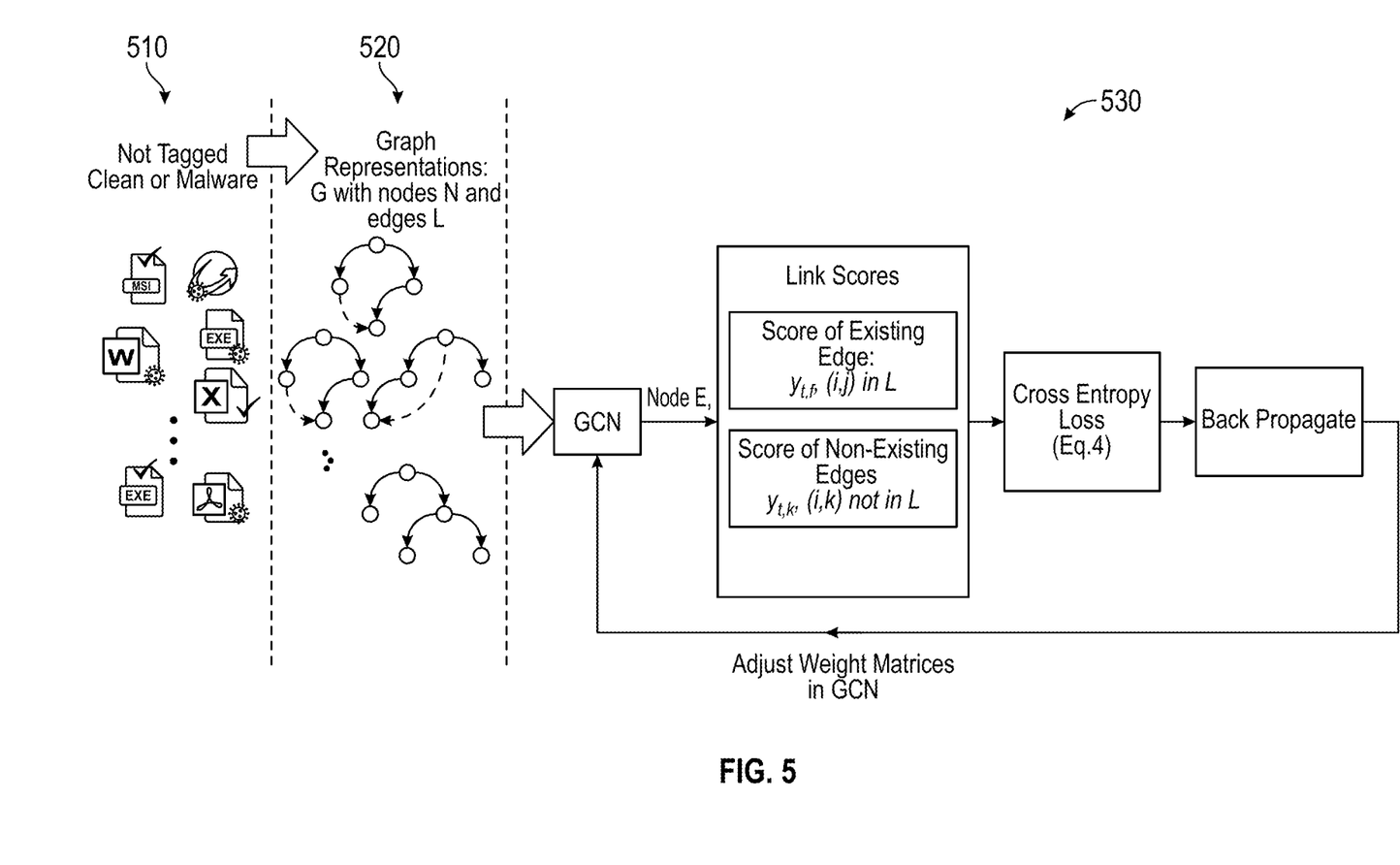
FIG. 5 is a more detailed flow diagram illustrating training with GCN, according to an embodiment.
Figure 6:
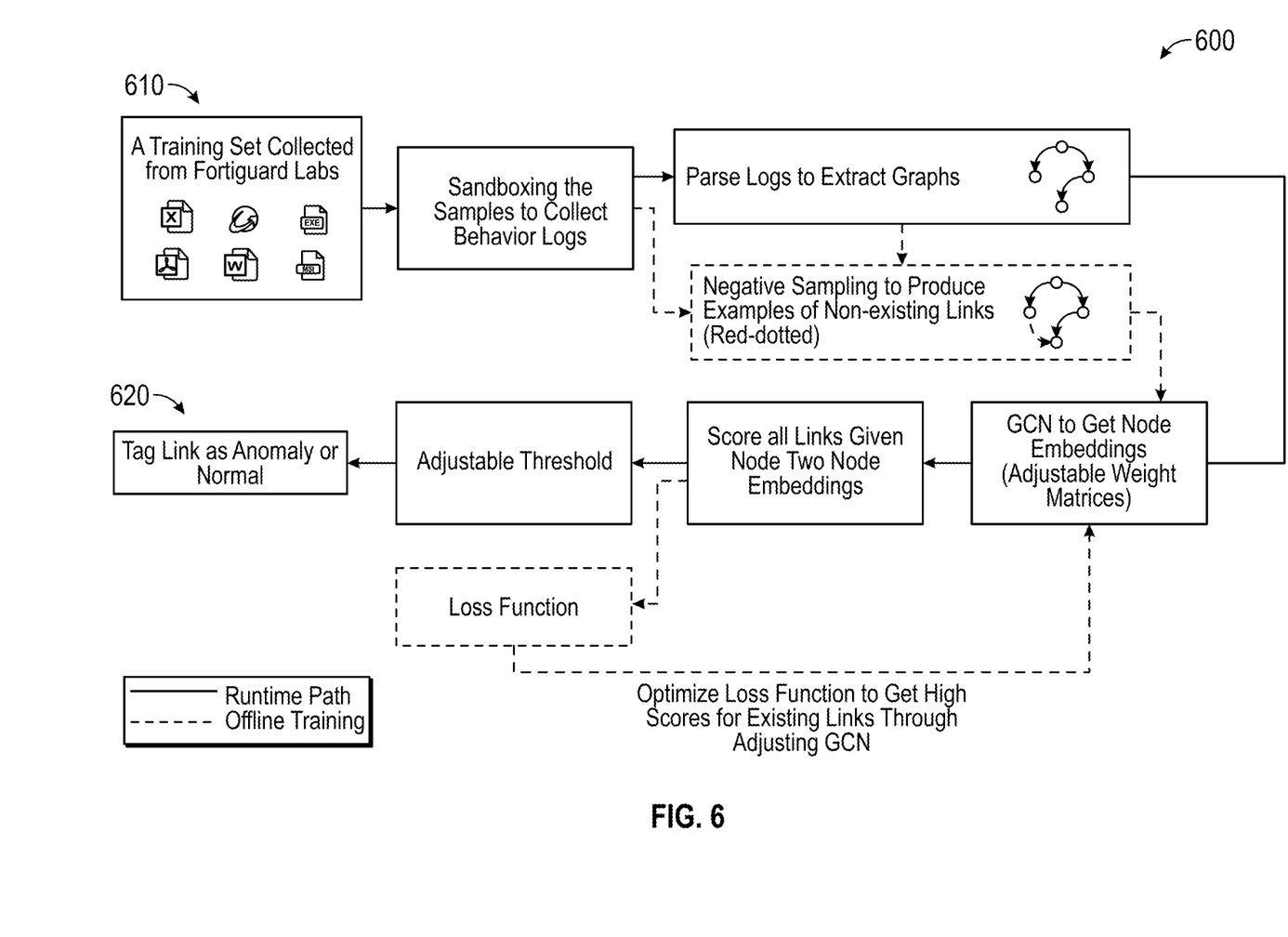
FIG. 6 is a more detailed flow diagram illustrating runtime with GCN, according to an embodiment.

In one embodiment, the sandbox engine 110 models runtime behavior of files using a graph network as shown in FIG. 3, for example. Parameters of GCN are adjusted from thousands of samples. Cross entropy loss is minimized to achieve the link prediction objective. The dotted lines show negative sample edges, where a link between nodes does not exist. In processes 500 and 600 of FIGS. 5 and 6, respectively, solid lines show steps required for both runtime link prediction and offline training, while the dotted lines show steps needed for offline training. Turning to FIG. 5, link prediction training phase of thousands of samples are used to adjust parameters of a GCN. Cross entropy loss is minimized in FIG. 6 to achieve the link prediction objective. Untagged files are received 510, and graphically received 520 for GCN recursive processing 530. In FIG. 6, a training set 610 is tagged as anomaly or normal 620. To do so, files are executed in a sandbox and behavior logs are modeled by graph. GCN is applied to get node embeddings of each graph. A dot product to node embeddings is applied to get link scores. Each score is compared against a preset threshold value to determine low-score links. Finally, low-score links are tagged as anomaly.

A file being analyzed can be a PE (portable executable) Windows operating system sample, Microsoft Office files, Android application files, Linux executables, and the like. As shown in a tree 300 of FIG. 3, nodes (e.g., 301) are objects (e.g., files, operations on files, network traffic, etc.) in the graph and edges (e.g., 302A, 302B) denote the hierarchal relationship among them. Application of GCN to obtain an embedding (real-value vector with fixed dimension) representing each node in the graph. Generally, GCN is a learning technology using a neural network that operates on graphs. Each node embedding is a function of its features as well as those of its neighbors. A machine learning system based on link prediction predicts normal edges in the graph, where a specific behavior is expected with high score. Otherwise, low-scored edges show potential anomalies. Application of link prediction allows semi-supervised training that does not need all samples to be labeled.

Figure 4:
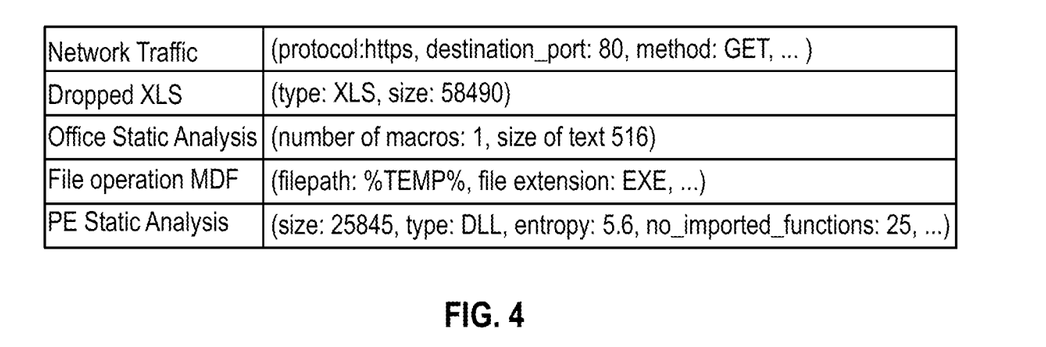
FIG. 4 is a table showing an example of features extracted from a parsed node of the behavior log of FIG. 3, according to an embodiment.

Each node of the tree 300 in FIG. 3 is parsed to extract features as shown in a table 400 of FIG. 4. The heterogenous architecture permits connecting different node types as well as different link types, such as (Network Traffic, drops, XLS object) and (Network Traffic, uses_URL, URL address) in which links drops and links uses_URL connect nodes of different types.

Embedding of a graph is a real-valued vector with a fixed dimension that numerically represent that graph. Ideally, for two graphs with similar nodes and topology, embeddings should be numerically similar as well (for example cosine similarity). To obtain graph embeddings, embeddings of its nodes should be obtained first. One way to define embeddings is application of graph convolutional network (GCN). Consider a graph defined by:

$$G(N,L), N=\{0,1,\ldots,n\},$$

$$L=\{(i,j), i,j \in N\}$$

where set N denotes nodes of a graph with edges (i,j) defined in set L. Each node belongs to a type family $t \in \{0,1,\ldots,T\}$. Neighbors of a node i with type t are denoted by set $N_{i,t}$. Each node can have arbitrary number of neighbors of different types. Given these definitions, for a node i, its embedding corresponding to nodes of type t is given by $$E_{it} = \frac{1}{|N_{i,t}|} \sum_{j \in N_{i,t}} (W_t X_j)$$

which denotes that its embedding is a mapped average, through matrix Wt, of all its neighboring nodes of type t with features Xj. To derive the embedding Ei with respect to all nodes belonging to potential types the $t \in \{0,1,\ldots,T\}$, Eit should be calculated for all node type t and averaged. This first layer embedding Eit is calculated using node features Xj. To obtain higher order embeddings, node features Xj should be replaced by the previous order embeddings Ej. The graph embedding can be defined as average of all node embeddings of a defined order k.

Weight matrices Wt are initialized from a random number generator. This will provide a degree of accuracy where similar nodes in the graph will have similar embeddings. TO gain better accuracy, these weight matrices can be further adjusted. A machine learning framework is defined that learns to predict existing edges in the graph between two nodes by assigning a high score to it. For the non-existing edges, it learns to predict a potential edge through assigning a low score to it. The process of learning is defined as adjusting the weight matrices and other adjustable parameters.

A machine learning paradigm is proposed to train the GCN network such that it helps predicting an existing links and tag links that are anomalies. The following score is defined which is desired to be high for an existing link and low for potential anomaly:

$$y_{ij} = <y_i, y_j>$$

where vectors yi and yj denote embeddings of nodes. A training data set is prepared by running thousands of samples in a sandbox system, collect the behavior log, and, finally, form the behavior graph G(N,L). To form the training objective function, a loss function is defined as follows $$\mathcal{L} = -\sum_{(i,j) \text{ in } \mathcal{L}} \log[\sigma(y_{ij})] - \sum_{(i,j) \text{ not in } \mathcal{L}} \log[1 - \sigma(y_{ij})]$$

Additional embodiments of the sandbox engine are set forth below with respect to FIG. 2.

Network applications 112 can be network browsers, daemons communicating with other network devices, network protocol software, and the like. An operating system 114 within the sandbox device 100 executes software, processes. Standard components of the real OS environment 114 include an API module, a process list, a hardware information module, a firmware information module, and a file system. The operating system 114 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The network processor 120 (e.g., optimized for IEEE 802.11, IEEE 802.11AC or IEEE 802.11AX), can be implemented by or supported by a general-purpose processor, an application-specific integrated circuit (ASIC), a field programmable gate array (FPGA), a reduced instruction set controller (RISC) processor, an integrated circuit, or the like.

Qualcomm Atheros, Broadcom Corporation, and Marvell Semiconductors manufacture processors that are optimized for IEEE 802.11 devices. The network processor 120 can be single core, multiple core, or include more than one processing elements. The network processor 120 can be disposed on silicon or any other suitable material. The network processor 120 can receive and execute instructions and data stored in the memory 110 or the storage drive 130.

The storage drive 130 can be any non-volatile type of storage such as a magnetic disc, EEPROM (electronically erasable programmable read-only memory), Flash, or the like. The storage drive 130 stores code and data for applications.

The I/O port 140 further comprises a user interface 142 and a network interface 144. The user interface 142 can output to a display device and receive input from, for example, a keyboard. The network interface 144 (e.g., an RF antennae) connects to a medium such as Ethernet or Wi-Fi for data in network and output. Many of the functionalities described herein can be implemented with computer software, computer hardware, or a combination.

FIG. 2 is a more detailed illustration of the sandbox device 110 of the system 100 of FIG. 1. The sandbox device 110 includes a ML training module 210, a runtime module 220 and a security action module 230. The modules can be implemented in source code stored in non-transitory memory executed by a processor. Alternatively, the modules can be implemented in hardware with microcode. The modules can be singular or representative of functionality spread over multiple components. Many other variations are possible.

The ML training module 210 can parse logs for generating a set of heterogenous graphs having embedded nodes connected with edges determined with link prediction and denoting a hierarchical relationship between nodes. Each graph represents benign behavior from executing one of the files of a training database in the sandbox, wherein the nodes are embedded in the graph using GCN (graph convolution network) to calculate a real-valued vector with fixed dimension.

The runtime module 220 receives an untagged file in real-time for analysis from a network component, and to generate a graph of runtime behavior from sandbox of the suspicious file;

The graph scoring module 230, in an embodiment, compares sandbox behavior of untagged file against the training graph, calculate embedded scores from links, and if a score is below a predetermined threshold then behavior is suspicious and if above the predetermined threshold then behavior is benign.

The security action module 240 can take a security action against suspicious files.

II. Method for Identifying Suspicious Behavior in a Sandbox (FIG. 7)

Figure 7:
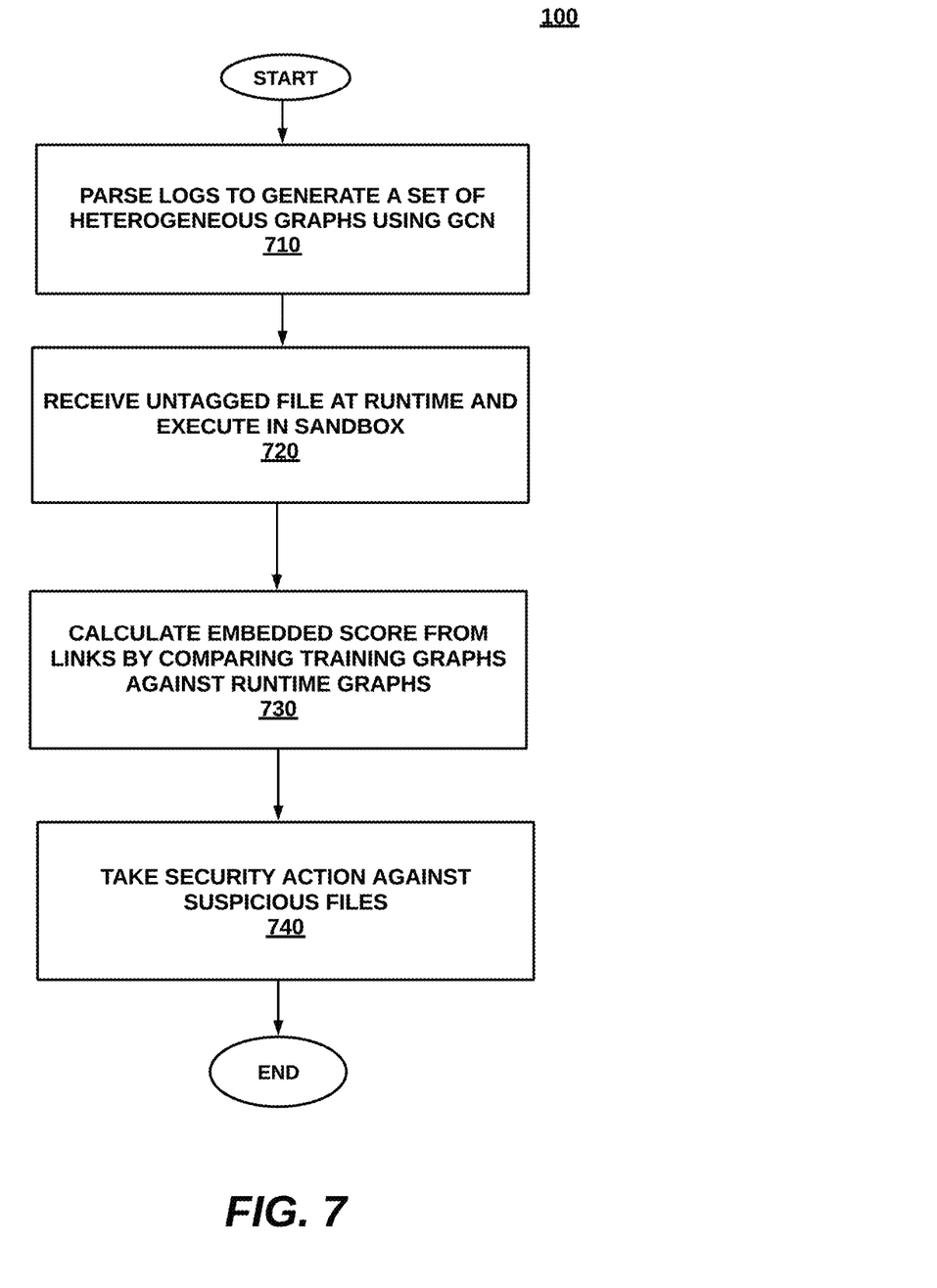
FIG. 7 is a high-level flow chart illustrating a method for identify suspicious behavior of files in a sandbox using graph networks, according to an embodiment.

FIG. 7 is a high-level flow diagram illustrating a method for identifying suspicious behavior of files in a sandbox using graph networks, according to one embodiment. The method 700 can be implemented, for example, by the system 100 of FIG. 1. The steps are merely representative groupings of functionality, as there can be more or fewer steps, and the steps can be performed in different orders. Many other variations of the method 500 are possible.

At step 710, logs are parsed for generating a set of heterogenous graphs having embedded nodes connected with edges determined with link prediction and denoting a hierarchical relationship between nodes, wherein the each graph represents benign behavior from executing one of the files of a training database in the sandbox, wherein the nodes are embedded in the graph using GCN (graph convolution network) to calculate a real-valued vector with fixed dimension.

At step 720, an untagged file is received in real-time for analysis from a network component, and to generate a graph of runtime behavior from sandbox of the suspicious file.

At step 730, sandbox behavior of untagged file is compared against the training graph, calculate embedded scores from links, and if a score is below a predetermined threshold then behavior is suspicious and if above the predetermined threshold then behavior is benign; and At step 740, a security action against suspicious files was taken.

III. Generic Computing Environment

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A sandbox server device, coupled to a data communication network, to identify suspicious behavior of files in a sandbox using graph networks, the sandbox server device comprising:
   a processor;
   a communication interface, communicatively coupled to the data communication network; and
   a memory, communicatively coupled to the processor and storing:
      a ML (machine learning) training module to parse logs and generate a set of heterogenous graphs having embedded nodes connected with edges determined with link prediction and denoting a hierarchical relationship between nodes, wherein each graph represents benign behavior from executing one of one or more files of a training database in the sandbox, wherein the nodes are embedded in the graph using a GCN (graph convolution network) to calculate a real-valued vector with fixed dimension, wherein an entropy loss function is minimized in the GCN to maximize scores of existing links and to minimize scores of non-existing links;
      a runtime module to receive an untagged file in real-time for analysis from a network component, and to generate a graph of runtime behavior from the sandbox of the untagged file;
      a graph scoring module to compare sandbox behavior of the untagged file against the runtime behavior graph, to calculate embedded scores of links of the generated graph, and if a score is below a predetermined threshold then the sandbox behavior is suspicious and if the score is above the predetermined threshold then the sandbox behavior is benign, wherein the graph scoring module applies a dot product to node embeddings to get link scores from the minimized entropy loss function; and a security action module to take a security action against suspicious files.

2. The sandbox server device of claim 1, wherein the runtime behavior comprises one or more of memory operations, process tree, registry operations, network traffic and dropped files.

3. The sandbox server device of claim 1, wherein the training database comprises files from a specific entity, wherein the specific entity also sources the runtime behavior.

4. The sandbox server device of claim 1, wherein a back propagation to loss function is performed to get a signal for adjusting GCN parameters.

5. A method performed by a sandbox server device for identifying suspicious behavior of files in a sandbox using graph networks, the method comprising:
   parsing logs and generating a set of heterogenous graphs having embedded nodes connected with edges determined with link prediction and denoting a hierarchical relationship between nodes, wherein each graph represents benign behavior from executing one of one or more files of a training database in the sandbox, wherein the nodes are embedded in the graph using a GCN (graph convolution network) to calculate a real-valued vector with fixed dimension, wherein an entropy loss function is minimized in the GCN to maximize scores of existing links and to minimize scores of non-existing links;
   receiving an untagged file in real-time for analysis from a network component, and generating a graph of runtime behavior from the sandbox of the untagged file;
   comparing sandbox behavior of the untagged file against the runtime behavior graph;
   calculating embedded scores from links of the generated graph, and if a score is below a predetermined threshold then the sandbox behavior is suspicious and if the score is above the predetermined threshold then the sandbox behavior is benign, wherein the graph scoring module applies a dot product to node embeddings to get link scores from the minimized entropy loss function; and
   taking a security action against suspicious files.

6. The method of claim 5, wherein the runtime behavior comprises one or more of memory operations, process tree, registry operations, network traffic and dropped files.

7. The method of claim 5, wherein the training database comprises files from a specific entity, wherein the specific entity also sources the runtime behavior.

8. The method of claim 5, wherein a back propagation to loss function is performed to get a signal for adjusting GCN parameters.

9. A non-transitory computer-readable medium storing code in a sandbox server device, implemented at least partially in hardware, when the code is executed by a processor, for performing a method of identifying suspicious behavior of files in a sandbox using graph networks, the method comprising:
   parsing logs and generating a set of heterogenous graphs having embedded nodes connected with edges determined with link prediction and denoting a hierarchical relationship between nodes, wherein each graph represents benign behavior from executing one of one or more files of a training database in the sandbox, wherein the nodes are embedded in the graph using a GCN (graph convolution network) to calculate a real-valued vector with fixed dimension, wherein an entropy loss function is minimized in the GCN to maximize scores of existing links and to minimize scores of non-existing links;

receiving an untagged file in real-time for analysis from a network component, and to generate a graph of runtime behavior from the sandbox of the untagged file;

comparing sandbox behavior of the untagged file against the runtime behavior graph;

calculating embedded scores from links of the generated graph, and if a score is below a predetermined threshold then the sandbox behavior is suspicious and if the score is above the predetermined threshold then the sandbox behavior is benign, wherein the graph scoring module applies a dot product to node embeddings to get link scores from the minimized entropy loss function; and a security action module to take a security action against suspicious files.

10. The non-transitory computer-readable media of claim 9, wherein the runtime behavior comprises one or more of memory operations, process tree, registry operations, network traffic and dropped files.

11. The non-transitory computer-readable media of claim 9, wherein the training database comprises files from a specific entity, wherein the specific entity also sources the runtime behavior.

12. The non-transitory computer-readable media of claim 9, wherein a back propagation to loss function is performed to get a signal for adjusting GCN parameters.

* * * * *